United States Patent [19]

Kerkman et al.

[11] Patent Number: 4,680,695

[45] Date of Patent: Jul. 14, 1987

[54] CROSS COUPLED CURRENT REGULATOR

[75] Inventors: Russel J. Kerkman; Timothy M. Rowan, both of Milwaukee, Wis.

[73] Assignee: Allen-Bradley Company, Milwaukee, Wis.

[21] Appl. No.: 922,775

[22] Filed: Oct. 27, 1986

Related U.S. Application Data

[63] Continuation of Ser. No. 735,659, May 20, 1985, abandoned.

[51] Int. Cl.[4] .......................... H02P 13/30; H02P 5/40
[52] U.S. Cl. .................................... 363/160; 363/163; 363/164; 318/803; 318/800; 318/807
[58] Field of Search .................... 363/10, 149, 159–165

[56] References Cited

U.S. PATENT DOCUMENTS 4,509,003  4/1985  Ohnishi et al. ........................ 318/800
4,555,755  11/1985  Kurosawa et al. ................... 318/803

OTHER PUBLICATIONS

Gabriel et al, "Microprocessor Control of Induction Motor", International Semiconductor Power Conference, Orlando, Fla. May 24–27, 1982.

Bose, Poik., "Adjustable Speed AC Drives–Technology Status Review", Proceedings of the IEEE, vol. 70, No. 2, Feb. 1982, pp. 116, 128 & 129.

Leonhard, W., *Control of Electrical Devices*, Springer-Verlag, 1985, pp. 224–237.

Gabriel et al, "Field Oriented Control of A Standard AC-Motor Using Microprocessors", Conference, Industry Applications Society IEEE-IAS Annual Meeting, Cleveland, OH. 30 Sep.–4 Oct.

*Primary Examiner*—David Smith, Jr.
*Attorney, Agent, or Firm*—Barry E. Sammons

[57] ABSTRACT

A current regulator for a variable frequency power supply includes a proportional plus integral circuit that produces a composite control output signal for each phase. To improve the performance of the current regulator at higher frequencies, the composite control output signal for each phase also inlcudes a cross coupled component which is produced by multiplying a d.c. signal proportional to frequency times an integrator output signal from another phase. The composite control signals are applied to a voltage source inverter which produces the output currents to a load.

5 Claims, 5 Drawing Figures

CROSS COUPLED CURRENT REGULATOR

This application is a file wrapper continuation of U.S. patent application Ser. No. 735,659, filed May 20, 1985 now abandoned.

BACKGROUND OF THE INVENTION

The field of the invention is variable speed drives for a.c. motors, and particularly, to alternating current sources which provide polyphase, variable frequency, and variable amplitude currents to motor stator windings.

Prior alternating current sources employ solid state switches to produce pulse waveforms that approximate sinusoidal waveforms suitable for application to the motor's stator windings. These are generally divided into two classes: those which employ current source inverters; and those which employ voltage source inverters. A current source inverter receives a controlled d.c. "link" current and switches it between the motor stator windings in such a manner as to approximate the application of polyphase sinusoidal currents of the proper frequency and amplitude. Such an inverter is disclosed, for example, in U.S. Pat. No. 4,400,655. A voltage source inverter on the other hand, receives a d.c. voltage and chops it into a series of voltage pulses which are applied to the motor stator windings. The widths of the pulses are modulated such that the resulting currents produced in the motor stator windings have a sinusoidal shape of the desired frequency and amplitude. Such an inverter is shown, for example, in U.S. Pat. No. 4,469,997.

Both the current source and the voltage source inverters have their respective advantages and disadvantages which are well-known in the art. As a result, both technologies are employed in commercially available motor drive products, with the choice being determined primarily by performance and price consideration.

The present invention solves a problem which is inherent in prior voltage source inverters that employ current regulators. It has long been recognized that at high motor speeds such voltage source inverters do not accurately control sinusoidal motor currents. This has been attributed by some to a loss in gain in voltage source inverters at high speeds, while others relate the problem to the back e.m.f. of the motor. Numerous schemes for solving this problem have been proposed, some of which involve compensation circuitry that is either very complex or that requires detailed knowledge about the particular motor being driven.

The inability of such voltage souce inverters to accurately produce current waveforms of commanded amplitude and phase is particularly troublesome when such inverters are used in a motor drive that relies on controlling the magnetic flux vector. Such vector control strategies require that the amplitude and phase of the sinusoidal current waveform applied to each stator winding be precisely controlled at all times. Only then will the total magnetic flux have the proper magnitude and direction to produce the desired motor torque and speed.

SUMMARY OF THE INVENTION

The present invention relates to variable frequency a.c. power supplies which employ voltage source inverters, and particularly, to a means for improving the current regulating capability of such inverters at high frequencies. The present invention includes means for producing an error signal by subtracting an a.c. current feedback signal from an a.c. current command signal and means for producing a composite control signal for a voltage source inverter by adding a signal component proportional to the error signal to a signal component proportional to the integral of the error signal and to a cross-coupled component which increases in amplitude as a function of frequency. The cross-coupled component is produced by a multiplier which connects to receive a signal component from another phase of the current regulator and to receive a signal proportional to the frequency of the a.c. current command signal.

A general object of the invention is to accurately regulate the a.c. current produced by a voltage source inverter. The current regulator of the present invention eliminates errors which are introduced into the current regulator by the conventional proportional plus integral (PI) compensation circuit that is uniformly employed. It has been discovered that such conventional PI compensation circuits are not accurate when regulating a.c. currents. This inaccuracy increases as a function of the a.c. frequency of the currents being regulated, and this accounts for the difficulties which are encountered when current regulated voltage source inverters are employed to drive electric motors. Unlike prior circuits, the present invention provides accurate current regulation under steady-state conditions at any operating frequency.

Another object of the invention is to provide current regulation for a voltage source inverter which is economical to build and operate. The improved current regulator includes only a few passive components and integrated circuits in addition to those normally employed in a conventional PI current regulator.

Another object of the invention is to improve the operation of polyphase motor drive systems which employ vector control strategies to control motor speed, torque or magnetic flux. The present invention may be employed to control the magnitude of n separate a.c. phase currents in response to two orthogonal a.c. current command signals. The magnitude and phase of the resulting motor currents accurately reflect the commanded currents at all operating frequencies.

Yet another object of the invention is to provide a current regulator which is accurate over a wide range of motor speeds, but which is not dependent on the particular motor with which it is used. In contrast to prior, high performance regulators, the regulator of the present invention does not require compensation, or adjustment, to operate properly with each motor. The technique employed by the present invention is substantially independent of the motor parameters.

The foregoing and other objects and advantages of the invention will appear from the following description. In the description, reference is made to the accompanying drawings which form a part hereof, and in which there is shown by way of illustration a preferred embodiment of the invention.

Such embodiment does not necessarily represent the full scope of the invention, however, and reference is made therefore to the claims herein for interpreting the scope of the invention.

DESCRIPTION OF THE PREFERRED EMBODIMENT

Figure 1:
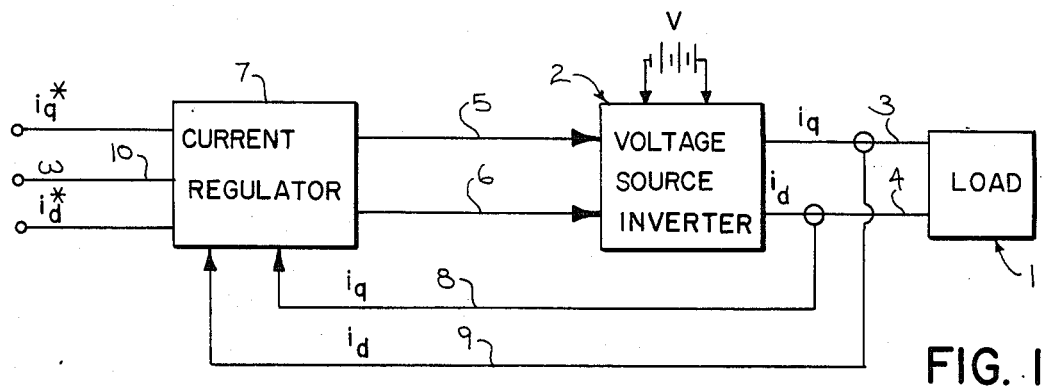
FIG. 1 is a block diagram of a current regulated voltage source inverter driving a two-phase load.
Figure 5:
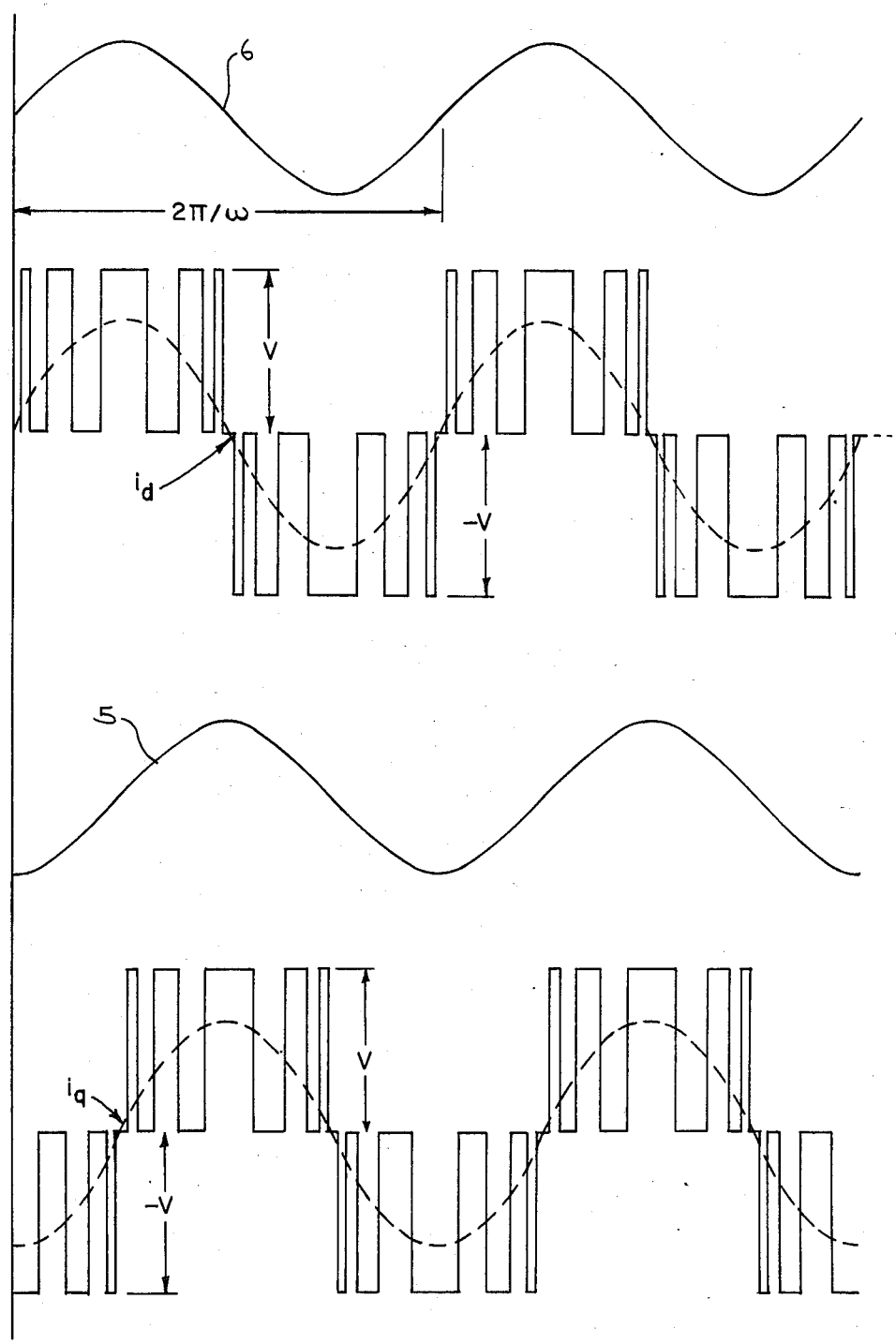
FIG. 5 are graphic representations of currents and voltages which appear at various points in the system of FIG. 1.

Referring particularly to FIG. 1, a load 1 is supplied with two-phase a.c. power by a voltage source inverter 2. The load 1 may be any one of a number of devices such as a synchronous motor, induction motor, electrostatic precipitator, induction heating unit or corona treater. The voltage source inverter 2 is a well-known circuit which produces pulse width modulated voltage pulses on the lines 3 and 4 in response to control signals on lines 5 and 6. As shown in FIG. 5, these voltage pulses have a constant amplitude (V), but their widths are modulated such that the currents, $i_q$ and $i_d$ flowing in the respective lines 3 and 4 are substantially sinusoidal in shape. The amplitude, frequency and phase of these output currents $i_q$ and $i_d$ are determined by the amplitude, frequency and phase of the control signals on lines 5 and 6. Voltage source inverters such as those described in U.S. Pat. Nos. 4,469,997; 3,830,003 and 3,700,987 may be employed for this purpose.

The output currents $i_q$ and $i_d$ are precisely controlled by a current regulator 7 which producs the control signals on the inverter input lines 5 and 6. The current regulator 7 receives two sinusoidal current command signals, $i_q^* = I_q \sin \omega t$ and $i_d^* = I_d \sin(\omega t - 90)$, which are compared with sinusoidal current feedback signals $i_q$ and $i_d$ that are received from current sensors through respective lines 8 and 9. It is the function of the current regulator 7 to produce sinusoidal control signals on the lines 5 and 6 which will drive the voltage source inverter 2 in such a manner as to cause the respective feedback signals $i_q$ and $i_d$ to equal the current command signals $i_q^*$ and $i_d^*$. There are numerous well-known current regulators which purport to perform this function, but in all but the most complex circuits, these prior current regulators fail to perform accurately over a wide range of frequencies. As will be discussed in more detail below, as part of the solution to this problem the current regulator 7 of the present invention employs a d.c. input signal ($\omega$) on line 10 which has a magnitude proportional to the frequency of the command currents $i_q^*$ and $i_d^*$.

Figure 2:
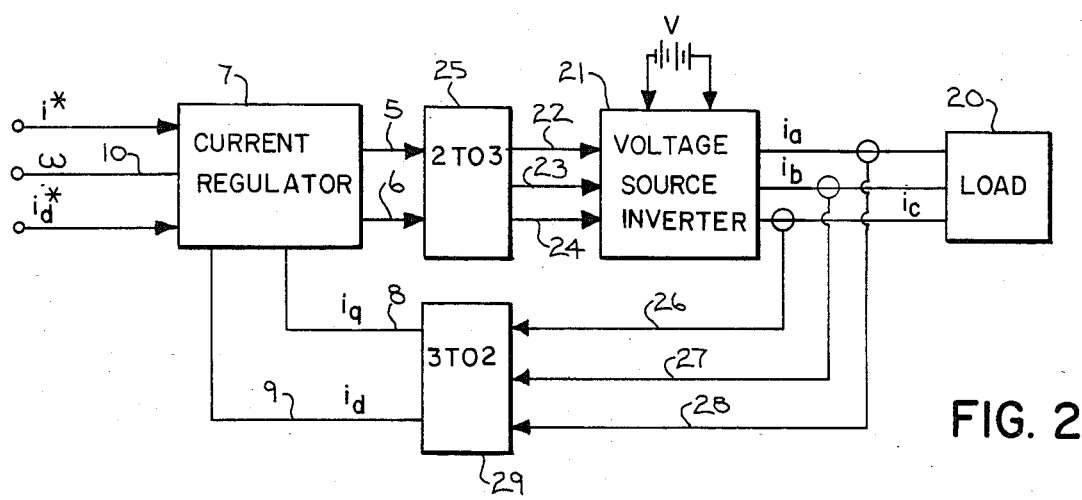
FIG. 2 is a block diagram of a current regulated voltage source inverter driving a three-phase load.

Referring particularly to FIG. 2, a current regulated voltage source inverter system may also be employed to drive a three-phase load 20. A voltage source inverter 21 similar to that used in the two-phase system may be employed, however, it is driven by three sinusoidal control signals on lines 22-24 and it produces three output currents $i_a$, $i_b$ and $i_c$. The three-phase output currents ($i_a$, $i_b$, $i_c$) have the same magnitude and frequency, but they are displaced 120 degrees in phase.

The same regulator 7 may be employed in this three-phase system, but phase conversions must be made. More specifically, the two-phase current regulator control signals which are output on lines 5 and 6 must be converted to the equivalent three-phase signals on lines 22-24. This conversion is performed by a 2-phase-to-3-phase converter circuit 25 of well-known construction. For example, a circuit such as that described in "Control and Simulation of a Current Fed Linear Inductor Machine" by B. K. Bose and Thomas Lipo published in *IEEE-IAS Conference Record*, pp. 876-883, 1978, may be employed for this purpose. Conversely, the three output currents $i_a$, $i_b$ and $i_c$ which are fed back through lines 26-28 are converted to two-phase feedback signals $i_q$ and $i_d$ by a 3-phase-to-2-phase converter circuit 29. A circuit such as that described in "Control Methods for Good Dynamic Performance Induction Motor Drives Based on Current and Voltage as Measured Quantities", by Robert Joetten and Gerhard Maeder and published in *IEEE-IAS Transactions*, IA-19, No. 3, May/June 1983, may be employed for this purpose.

It should be apparent to those skilled in the art that the current regulator of the present invention may be employed in a wide variety of applications to control a.c. loads having any number of phases. Also, the current command signals $i_q^*$ and $i_d^*$, as well as the speed signal $\omega$, may be produced by any one of a number of well-known control circuits The specific construction of the control circuit will depend on the nature of the load and on the particular control strategy which is being implemented. A number of different control circuits for a.c. motors are disclosed in U.S. Pat. Nos. 4,506,321 and 4,266,176.

The current regulator of the present invention provides a combination of proportional control action, integral control action, and cross coupled speed compensation action. The "q" phase and the "d" phase are handled in the same manner, and the corresponding functional blocks and circuit elements in each phase of the current regulator have been given the same reference number.

Figure 3:
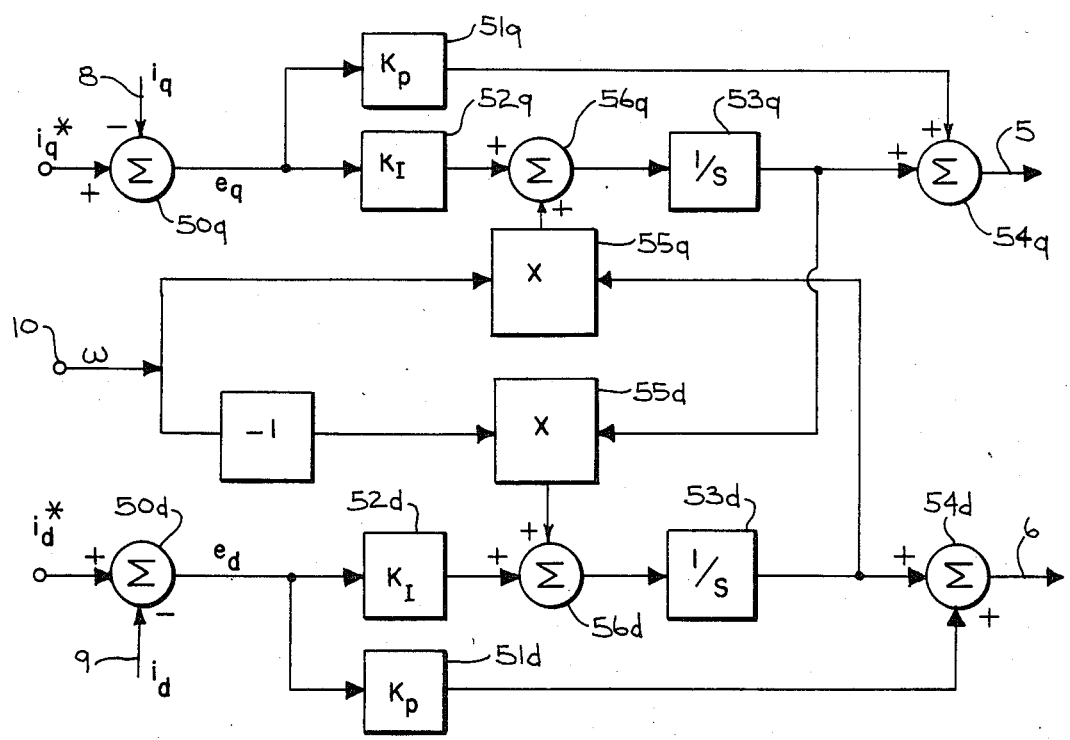
FIG. 3 is a functional diagram of a current regulator which employs the present invention.

Referring particularly to FIG. 3, the sinusoidal current feedback signal $i_q$ is subtracted from the sinusoidal current command signal $i_q^* = I_q \sin \omega t$ at a summing point $50_q$. The resulting error signal ($e_q$) produces a proportional control signal through a proportional block $51_q$ and an integral control signal through blocks $52_q$ and $53_q$. These two control signals are added together at summing point $54_q$ to produce the composite control signal on line 5.

This composite control signal also includes a cross-coupled component which increases in magnitude at higher frequencies ($\omega$). It is produced by a multiplier block $55_q$ that receives a cross-coupled signal from the integrator block $53_d$ of the other phase. The amplitude of this crosscoupled signal is modulated by a second input to the multiplier $55_q$ which is proportional to frequency. This second input is the d.c. frequency signal ($\omega$) on the line 10. The cross-coupled component which is output by the multiplier $55_q$ is added at a summing point $56_q$ which connects to the input of the integrator $53_q$.

Under steady state conditions the error signals $e_q$ and $e_d$ should be zero. The composite control signals on the lines 5 and 6, however, must be waveforms which cause the voltage source inverter 21 to produce output currents corresponding to the commanded currents $i_q^*$ and $i_d^*$. Under most operating conditions these composite control signals are substantially sinusoidal in shape as shown in FIG. 5. These steady state sinusoidal composite control signals are produced by the cross-coupling of the present invention. More specifically, under steady state conditions the cross connections between the two phases form an oscillator which operates at the commanded frequency. The amplitude of the cross-coupled component produced by this oscillator is proportional to frequency. If for any reason an error signal develops in either phase, the input to the affected integrator $53_q$ or $53_d$ will at that instant include both the cross-coupled component and an error component ($K_Ie$). The resulting composite control signals on the corresponding output line 5 or 6 will include the integral of these two components and a component proportional to the error signal ($K_pe$). This composite control signal will force the error signals $e_q$ and $e_d$ to zero through a coordinated control between the phases to insure balanced control even at higher frequencies.

Figure 4:
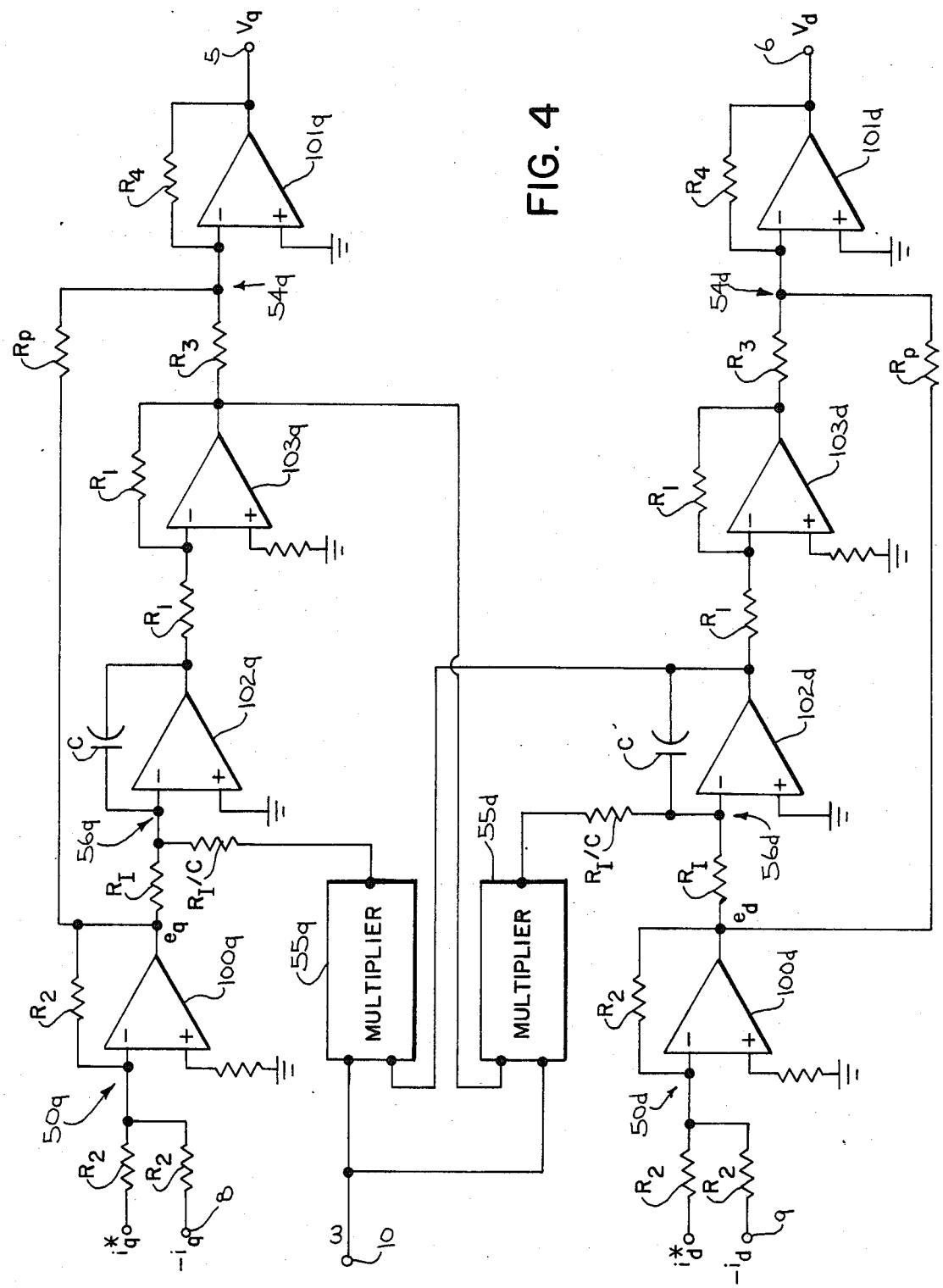
FIG. 4 is an electrical schematic diagram of the current regulation of FIG. 3.

Referring particularly to FIGS. 3 and 4, the preferred embodiment of the invention is constructed using passive components and standard, commercially available integrated circuits. The summing point $50_q$, for example, is implemented with an operational amplifier $100_q$ which receives the current command signal $i_q{}^*$ and current feedback signal $i_q$ at its inverting input. The values of resistors $R_2$ are the same to provide unity gain at the summing point $50_q$. Similarly, the summing point $54_q$ at the output is implemented with an operational amplifier $101_q$. The values of resistors $R_p$ and $R_4$ provide the gain ($K_p$) for the proportional block $51_q$, and the values of resistors $R_3$ and $R_4$ are the same to provide unity gain for the integral component.

The integral block $53_q$ is implemented with an operational amplifier $102_q$ having a feedback capacitor C connected between its output and its inverting input. An input resistor $R_I$, connects to the same inverting input and its value relative to the value of capacitor C provides the integral gain ($k_I$). An inverter having unity gain is formed by an operational amplifier $103_q$ and associated resistors $R_1$. This inverter insures that the signal produced by the integral block $53_q$ has the same sign as the signal produced by the proportional block $51_q$.

The inverting input to the operational amplifier $102_q$ also forms the summing point $56_q$ which receives the cross coupled signal from the multiplier $55_q$. The multiplier $55_q$ employs a commercially available integrated circuit manufactured by Motorola, Inc. and sold as part number MC 1595L. Its output connects to the summing point $56_q$ through a resistor having a value $R_I/C$. This provides a unity gain for the cross coupled component.

The multiplier $55_q$ is described in more detail starting at page 6-83 in the book "Linear Integrated Circuits", published by Motorola, Inc. in 1979. One of its inputs connects to the line 10 to receive the frequency signal $\omega$, and its other input connects to the output of the integrator in the other phase. The multipler $55_d$ is connected in a similar manner, but it connects to receive the inversion of the integrator output from the operational amplifier $103_q$.

An oscillator is formed by these cross connections. More specifically, a loop is formed by the multipler $55_q$, integrator $102_q$, inverter $103_q$, multiplier $55_d$ and integrator $102_d$. The phase shifts around this loop total 360 degrees which causes it to oscillate at the frequency $\omega$. The amplitude of the cross coupled signals produced by this oscillator is determined by the frequency $\omega$. The magnitude of the frequency signal $\omega$ is set to produce maximum possible signals at the outputs of the multipliers $55_q$ and $55_d$ when the highest operating frequency is reached.

While the preferred embodiment of the invention employs two phases (q and d) which are in quadrature with each other, current regulators having other numbers of phases may also be constructed. It is only necessary that the cross coupled signals have the proper phase and amplitude relationship. Referring to FIG. 3, for example, the q-phase composite control signal on the line 5 lags the d-phase composite control signal on line 6 by ninety degrees. The cross coupled signal from integrator block $53_q$ is shifted 180 degrees in phase by the inversion of the frequency signal $\omega$ into the multiplier $55_d$, and it is delayed another 90 degrees by the integrator block $53_d$ to bring it into phase with the d phase composite control signal on line 6. Conversely, the cross coupled signal from the output of integrator block $53_d$ is merely delayed 90 degrees by the integrator block $53_q$ to bring it into phase with the q-phase composite control signal on line 6. It should be apparent to those skilled in the art that with three or more phases cross coupled signals would be received from each of the other phases, and that the vector sum of these cross coupled signals should be in phase with the subject phase and have unity gain as described above.

We claim:

1. In a variable frequency power supply which receives a plurality of sinusoidal current command signals and produces sinusoidal output currents to a load, a polyphase current regulator for receiving the plurality of sinusoidal current command signals and producing composite control signals, each current regulator phase comprising:

first summing means for receiving at one input one of said sinusoidal current command signals and receiving at a second input a sinusoidal current feedback signal indicative of sinusoidal output current supplied to said load, the first summing means being operable to produce an error signal which is indicative of the difference between the sinusoidal current command signal and the sinusoidal current feedback signal;

second summing means for receiving at one input a signal proportional to said error signal and for receiving at a second input a cross coupled signal, the second summing means being operable to produce a summed signal which is proportional to the sum of the signals applied to its two inputs;

an integrator having an input connected to receive the summed signal from the second summing means and being operable to produce an integrator output signal which is the integral of the summed signal applied to its input;

third summing means for receiving at one input the integrator output signal and for receiving at a second input a signal proportional to said error signal, the third summing means being operable to produce one of the composite control signal which is proportional to the sum of the signals applied to its inputs; and means for producing said cross coupled signal which includes:

(a) a multiplier having its output connected to the second summing means, (b) means for coupling to one input on the multiplier a signal which is proportional in magnitude to the frequency of said one sinusoidal current command, and (c) means for coupling to another input on the multiplier a signal received from another of said current regulator phases.

2. The current regulator as recited in claim 1 in which the signal received from said another current regulator phase is proportional to the integrator output signal produced by an integrator in said another current regulator phase.

3. The current regulator as recited in claim 2 in which the current regulator has two phases and the two sinusoidal current command signals are phase displaced ninety degrees with respect to each other.

4. In a current regulator having a pair of phases, each phase providing a composite control signal to a voltage source inverter in response to a sinusoidal current command signal, each phase comprising:
  first summing means for producing an error signal equal to the difference between the sinusoidal current command signal and a current feedback signal;
  integrator means coupled to the first summing means for producing an integrator output signal which is proportional to the integral of the error signal;
  second summing means coupled to the first summing means and the integrator means for producing a composite control signal which is proportional to the error signal plus the integrator output signal;
  means for producing a frequency signal proportional to the frequency of the sinusoidal current command signal; and
  cross-coupling means for producing a cross-coupled signal which is applied to the integrator means and which is proportional to an integrator output signal from the other phase which is modulated in amplitude by the magnitude of the frequency signal.

5. In a current regulator having a pair of phases, each phase including an integrator which receives at its input an error signal formed by summing a sinusoidal current command and a current feedback signal, and which produces a signal at its output than is employed to control the current in a load, the improvement therein comprising:
  an oscillator loop for applying cross-coupled signals to each phase, and being formed by coupling the output of the integrator in each phase to the input of the integrator in the other phase, said oscillator loop including means connected to receive a signal indicative of the frequency of the sinusoidal current command and for controlling the magnitude of the cross-coupled signals as a function of said frequency.

* * * * *